US006812920B1

(12) United States Patent
Otsuka

(10) Patent No.: US 6,812,920 B1
(45) Date of Patent: Nov. 2, 2004

(54) DISPLAY DEVICE

(75) Inventor: Hiroshi Otsuka, Tokyo (JP)

(73) Assignee: NEC-Mitsubishi Electric Visual Systems Corporation, Tokyo (JP)

( * ) Notice: Subject to any disclaimer, the term of this patent is extended or adjusted under 35 U.S.C. 154(b) by 0 days.

(21) Appl. No.: 09/807,725

(22) PCT Filed: Nov. 4, 1999

(86) PCT No.: PCT/JP99/06147
§ 371 (c)(1),
(2), (4) Date: Apr. 18, 2001

(87) PCT Pub. No.: WO01/13353
PCT Pub. Date: Feb. 22, 2001

(30) Foreign Application Priority Data

Aug. 18, 1999 (JP) .......................................... P11-231263

(51) Int. Cl.[7] ................................................ G09G 5/06
(52) U.S. Cl. ........................ 345/211; 348/730; 315/106; 315/107; 345/10; 713/310; 713/320; 713/324
(58) Field of Search ......................... 345/211–213, 867, 345/10; 348/730; 713/320–324, 310; 315/106, 107, 360, 14

(56) References Cited

U.S. PATENT DOCUMENTS

| 5,335,168 A | * | 8/1994 | Walker ....................... 364/707 |
| 5,483,464 A | | 1/1996 | Song |
| 5,532,719 A | | 7/1996 | Kikinis |
| 5,560,022 A | | 9/1996 | Dunstan et al. |
| 5,579,252 A | | 11/1996 | Huang |
| 5,754,798 A | * | 5/1998 | Uehara et al. ............... 395/284 |
| 5,808,693 A | * | 9/1998 | Yamashita et al. .......... 348/554 |
| 5,919,263 A | | 7/1999 | Kikinis et al. |
| 6,005,559 A | * | 12/1999 | Miyamoto ................... 345/212 |
| 6,006,335 A | * | 12/1999 | Choi et al. ................... 713/310 |
| 6,504,534 B1 | * | 1/2003 | Takase et al. ................ 345/211 |

FOREIGN PATENT DOCUMENTS

| CN | 341673 | 10/1998 |
| CN | 351907 | 2/1999 |
| EP | 0803796 A2 | 10/1997 |
| KR | P0174356 | 4/1999 |
| WO | WO 96/41252 A1 | 12/1996 |

OTHER PUBLICATIONS

Japanese Patent Application Laid–Open No. 06–110396 (1994), with translation.
Japanese Patent Application Laid–Open No. 08–336080 (1996), with translation.
ASCII. PC, vol. 2, No. 8, Japan, ASCII Corporation, Aug. 1, 1999, p. 33, with translation.
How to Prolong Battery Life, VAIO Style, vol. 9, No. 35, Japan, Sony Magazines Inc., Aug. 1, 1999, p. 62, with translation.

* cited by examiner

Primary Examiner—Lun-Yi Lao
(74) Attorney, Agent, or Firm—Birch, Stewart, Kolasch & Birch, LLP

(57) ABSTRACT

A display device which is suitable for connection to a computer etc. allows an operator to freely set a power saving mode to suppress the wasteful consumption of power. Power reduction means reduces, in a plurality of modes, the power supplied to device components included in the display device. Power management output selecting means sets any of the plurality of modes on the basis of a selection made by an operator. Signal detecting means monitors horizontal and vertical synchronizing signals sent from a computer and detects as a trigger signal a state in which at least one of them is not being received. In response to the trigger signal being detected, power management signal output means gives an instruction to the power reduction means to perform the set mode.

5 Claims, 5 Drawing Sheets

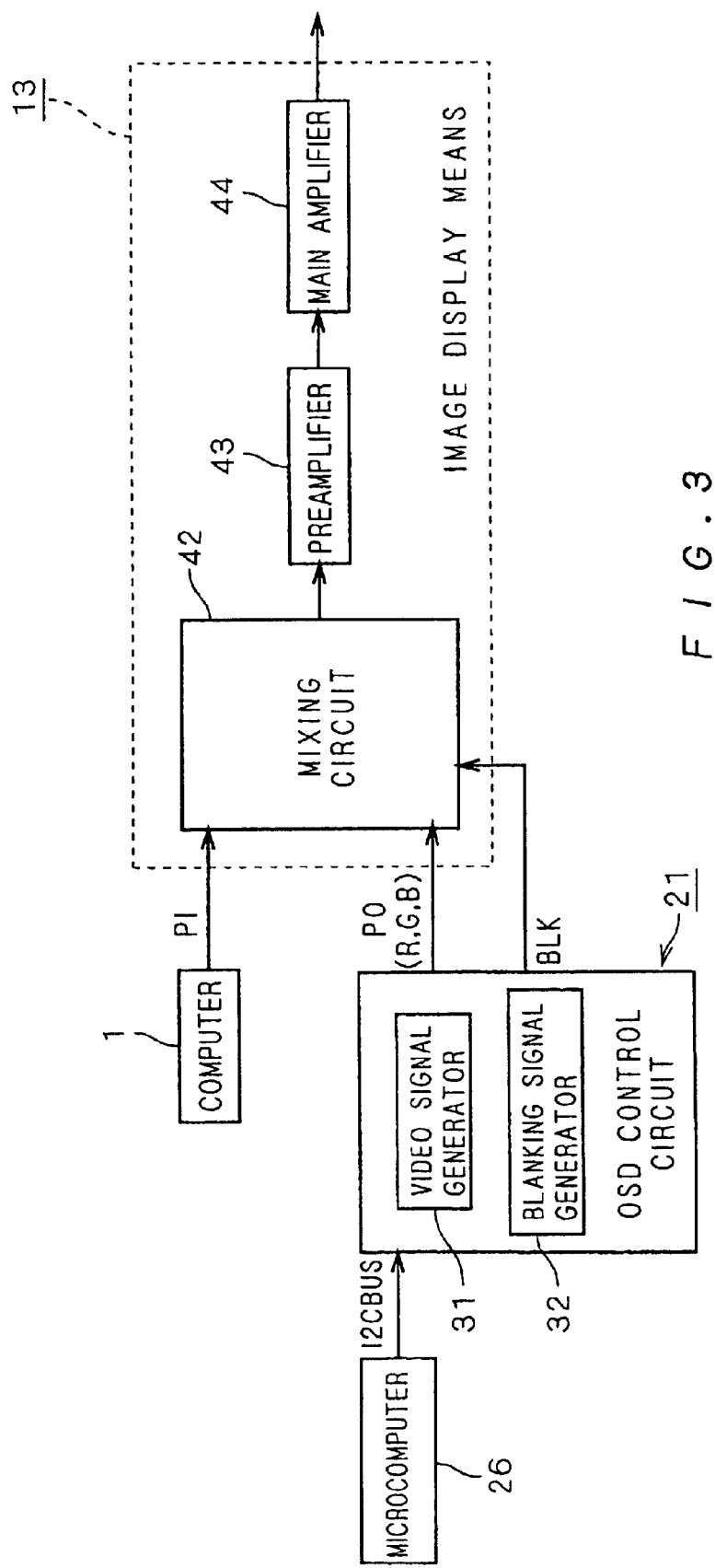
F I G. 3

F I G . 6
PRIOR ART

| DISPLAY MANAGEMENT MODE | HORIZONTAL SYNCHRONIZING SIGNAL | VERTICAL SYNCHRONIZING SIGNAL |
|---|---|---|
| NORMAL MODE | PRESENT | PRESENT |
| LEVEL 1 | ABSENT | PRESENT |
| LEVEL 2 | PRESENT | ABSENT |
| LEVEL 3 | ABSENT | ABSENT |

DISPLAY DEVICE

This application is the national phase under 35 U.S.C. § 371 of PCT International Application No. PCT/JP99/06147 which has an International filing date of Nov. 4, 1999, which designated the United States of America.

TECHNICAL FIELD

The present invention relates to a display device suitable for connection to a computer etc., and particularly to a display device having a power management function.

BACKGROUND ART

Generally, current display devices have a power management function of for reducing consumption of power to realize power savings. Functions of power management are standardized by Energy Star program by the United States Environmental Protection Agency, Video Electronics Standards Association, Swedish National Board for Industrial and Technical Development, etc. Also, there are many disclosed patent applications about power management. For example, Japanese Patent Application Laid-Open No. 58-99075 (1983) and Japanese Patent Application Laid-Open No. 1-177076 (1989) disclose techniques for ON/OFF controlling power supply to a CRT monitor by detecting-synchronizing signals from a video signal generator, and Japanese Patent National Publication of the Translation No. 8-508831 (1996) and Japanese Patent Application Laid-Open No. 6-110396 (1994) disclose in detail techniques for realizing energy saving in two or more control levels. In the techniques disclosed by the former two references, energy saving in a display device is realized in the absence of synchronizing signals when the computer is being used; in the techniques disclosed by the latter two references, two or more energy saving modes are realized according to the combination of absence/presence of synchronizing signals.

FIG. 5 is a block diagram showing the structure of a portion related to the power management of a conventional display device. As shown in FIG. 5, this display device 9 has signal detecting means 2, image display means 3, power management signal output means 4, power reduction means 6, power management ON/OFF signal detecting means 10 and an image output portion 20. The image output portion 20 is constructed as a cathode ray tube (CRT).

In the display device 9, as shown in FIG. 6, the power management modes include predetermined modes: Level 1 to Level 3. The display device 9 selectively realizes any of these modes on the basis of the combination of horizontal and vertical synchronizing signals sent from the computer 1. That is to say, fixed modes are realized according to the combination of horizontal and vertical synchronizing signals.

For example, in the technique described in the above-cited Japanese Patent National Publication of the Translation No. 8-508831, page 7, column 14, line 39 to page 8, column 15, line 2, several kinds of power reduction modes are determined in correspondence with combinations of presence/absence of horizontal synchronizing signal, vertical synchronizing signal and video signal sent from a computer etc., according to which consumption of power is lowered in several ways.

Referring to FIG. 5 again, when the computer 1 sends a combination of synchronizing signals which corresponds to a certain power management mode, the signal detecting means 2 detects this combination and sends it to the power management signal output means 4. On the basis of the combination of synchronizing signals sent from the signal detecting means 2, the power management signal output means 4 specifies the mode and sets power reduction in that mode. This technique is disclosed in Japanese Patent National Publication of the Translation No.8-508831, page 8, column 16, lines 26 to 44, for example.

The power reduction means 6 operates on the basis of instructions from the power management signal output means 4. As a result, the display device 9 changes from normal operation mode to a power management mode defined by the combination of the synchronizing signals. The operator 7 only selects ON/OFF of the power management operation by using OSD (On Screen Display) displayed on the screen 30 of the image output portion 20, for example.

The conventional display device configured to thus operate has the following problems.

Firstly, the display device realizes fixed power saving modes in accordance with individual combinations of signals sent from the computer etc., so that the user (operator) cannot freely select or set the power saving mode on the display device, which results in wasteful consumption of power.

Secondly, fixed voltages are applied to the heater in the image output portion 20 (i.e. CRT heater) in accordance with consumed power and recovery time (i.e. the time taken to enable the screen 30 to display an image when the power management operation is canceled) and the user cannot freely select the consumed power and recovery time in the power saving mode on the display device, resulting in consumption of wasteful power.

DISCLOSURE OF THE INVENTION

The present invention has been made to solve the problems above, and an object of the invention is to provide a display device which allows an operator to freely set a mode to suppress wasteful power consumption.

According to a first aspect of the present invention, a display device which displays an image on a screen in an image output portion on the basis of a received video signal comprises: power reduction means configured to reduce, in a plurality of modes, power supplied to a device component included in said display device; power management output selecting means configured to make a setting to any of said plurality of modes on the basis of a selection made by an operator; signal detecting means configured to detect a trigger signal; and power management signal output means configured to give an instruction to said power reduction means in response to detection of said trigger signal by said signal detecting means to perform said mode defined by said setting.

In accordance with the display device of the first aspect of the invention, power management operation (power saving operation) is realized in a mode selected by the operator. This suppresses consumption of wasteful power.

According to a display device of a second aspect of the invention, in the first aspect, the display device further comprises means configured to display said plurality of modes for selection on said screen in the form of on screen display and said power management output selecting means makes said setting according to which of said plurality of on-screen-displayed modes said operator has selected.

In accordance with the display device of the second aspect of the invention, the operator can select a desired mode from among a plurality of modes displayed in the form of on screen display (OSD), so that he/she can easily and correctly set the mode without a mistake.

According to a display device of a third aspect of the invention, in the second aspect, said device component includes a plurality of unit components and said means configured to display said plurality of modes in the form of on screen display displays items which can be selected individually for each said unit component as said plurality of modes on said screen in the form of on screen display.

In accordance with the display device of the third aspect of the invention, power saving operation can be selected for each unit component, so as to flexibly meet stricter power saving requirements.

According to a display device of a fourth aspect of the invention, in the first aspect, said image output portion is a cathode ray tube having a heater and said device component includes a CRT heater circuit configured to supply power to said heater, and wherein said plurality of modes include a mode in which supply of power to said heater is kept on.

In accordance with the display device of the fourth aspect of the invention, the mode of continuing supply of power to the heater of the cathode ray tube can be selected so that the image display can be reactivated immediately after the power management operation has been canceled.

According to a display device of a fifth aspect of the invention, in the first aspect, said signal detecting means monitors a horizontal synchronizing signal and a vertical synchronizing signal accompanying said video signal and detects as said trigger signal a state in which at least one of said synchronizing signals is not being received.

In accordance with the display device of the fifth aspect of the invention, operation changes from normal mode into power management mode in the absence of any of the horizontal and vertical synchronizing signals, so that the display device can be used as they are with external devices, e.g. a computer, which are used in connection with conventional display devices having power management function.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing internal structure of an image display means and OSD control circuit.

FIG. 6 is an explanation diagram showing, in the form of a table, power saving modes of the conventional display device.

BEST MODE FOR IMPLEMENTING THE INVENTION

Figure 1:
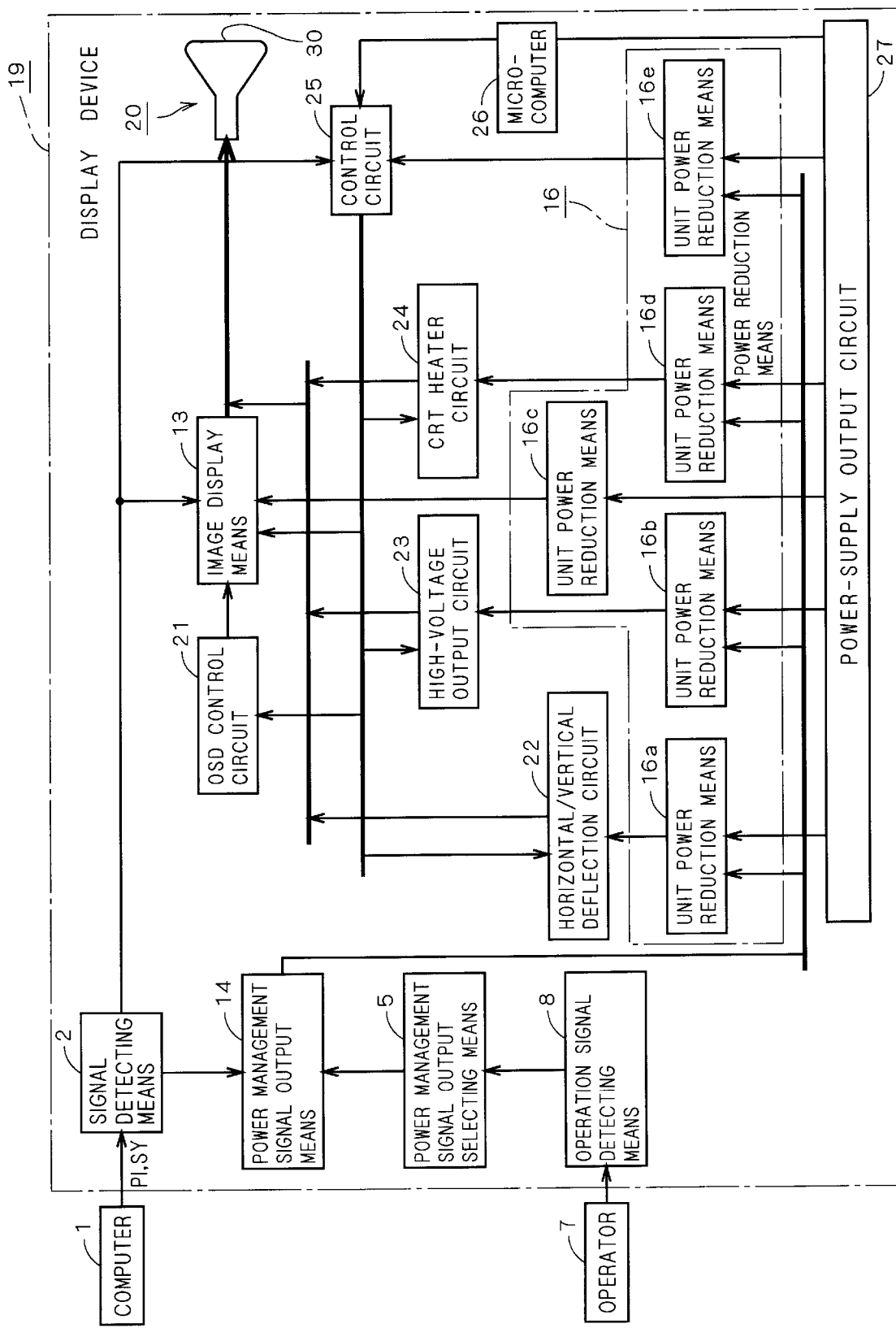
FIG. 1 is a block diagram showing the structure of a display device according to an embodiment of the present invention.

FIG. 1 is a block diagram showing the structure of a display device according to a preferred embodiment of the present invention. In this display device 19, image display means 13 sends a signal input to an image output portion 20 on the basis of a video signal PI and synchronizing signals SY which are supplied as inputs to signal detecting means 2. The image output portion 20 receives the signal from the image display means 13 and displays the image represented by the video signal PI on the screen 30. While various configurations are generally possible as the image output portion 20, the example of FIG. 1 adopts a cathode ray tube (CRT). As is known, the cathode ray tube has a heater (CRT heater).

The display device 19 has power-consuming device components subjected to the power management. The device components include a horizontal/vertical deflection circuit 22, a high-voltage output circuit 23, the above-mentioned image display means 13, a CRT heater circuit 24 and a control circuit 25, for example. The horizontal/vertical deflection circuit 22 drives vertical/horizontal deflection coils provided in the image output portion 20. The high-voltage output circuit 23 generates a high voltage to be supplied to the image output portion 20. The CRT heater circuit 24 supplies power to the heater in the image output portion 20. The control circuit 25 controls operations of the horizontal/vertical deflection circuit 22, high-voltage output circuit 23 and CRT heater circuit 24 on the basis of instructions from a microcomputer 26.

Power reduction means 16 is supplied with power from a power-supply output circuit 27; in power management operation, it provides control to lower power supplied to the power-managed device components. The power reduction means 16 is constructed to realize a plurality of modes (power saving modes) as the power management operation. Power management signal output means 14 indicates which mode to realize.

As shown in the example of FIG. 1, in order to realize a plurality of modes, the power reduction means 16 has a plurality of unit power reduction means 16a to 16e for individually controlling power supplied to the plurality of unit components 13, 22, 23, 24, 25 included in the power-managed device components. In the power reduction means 16, some (generally plural) of the unit power reduction means 16a to 16e, for example, reduce the supplied power on the basis of instructions from the power management signal output means 14. The power reduction includes turning off the power supply.

The operator 7 can enter a signal to select one of the plurality of modes by operating an input device, e.g. a keyboard. Operation signal detecting means 8 detects the operation signal representing the contents of operation presented by the operator 7. On the basis of the detected operation signal, power management signal output selecting means 5 sets which of the plurality of modes is to be realized during power management operation.

The signal detecting means 2 receives the horizontal and vertical synchronizing signals SY and video signal PI sent from the computer 1 etc. While monitoring the horizontal and vertical synchronizing signals SY and/or video signal PI, the signal detecting means 2 detects absence of these signals as a trigger signal to move into the power management operation (power saving operation). For example, it detects as the trigger signal the absence of at least one of the horizontal and vertical synchronizing signals SY.

In response to the trigger signal being detected by the signal detecting means 2, the power management signal output means 14 instructs the power reduction means 16 to implement power management operation on the basis of a mode preset in the power management signal output selecting means 5. For example, the power management signal output means 14 holds a plurality of instruction signals corresponding to the plurality of modes; it selects an instruction signal corresponding to the mode set by the power management signal output selecting means 5 and sends it to the power reduction means 16.

Thus, in the display device 19, any of the plurality of modes is selectively realized during power management operation on the basis of selection made by the operator 7. This suppresses wasteful consumption of power. Further, it is not necessary to change the form of signals conventionally sent from the computer to the display device. Moreover, the display device can immediately implement power management desired by the user (operator 7) without the need to change the mode in a time-series manner, e.g. from Level 1 to Level 3 as in the conventional one.

Figure 2:
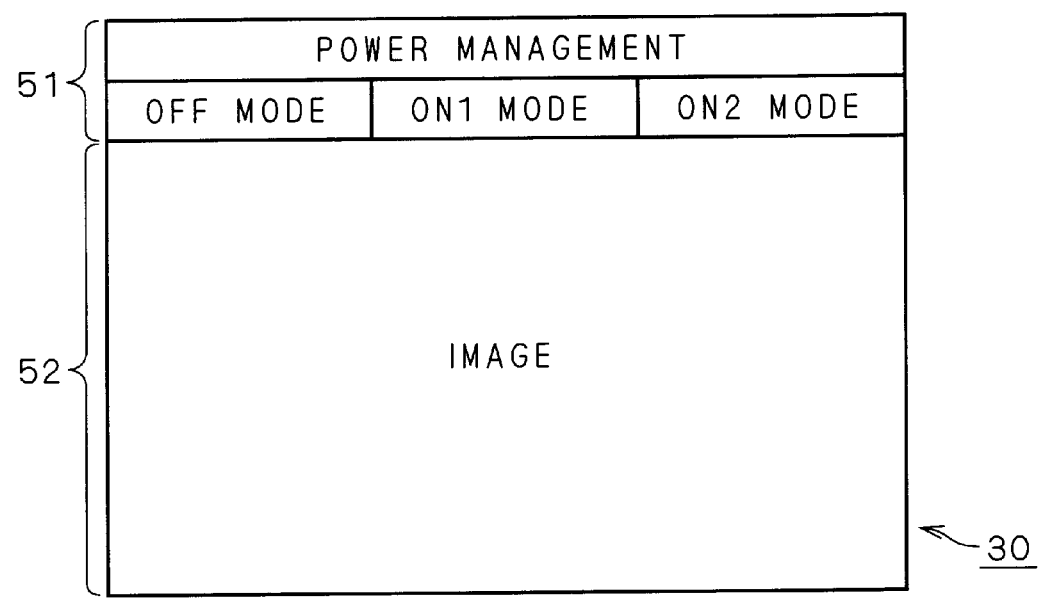
FIG. 2 is a schematic diagram showing an example of a plurality of power saving modes displayed in the form of OSD on the screen.

More preferably, the plurality of modes for selection are displayed in the form of OSD (On Screen Display) on the screen 30. This allows the operator to more easily and correctly select modes without mistakes. FIG. 2 is a schematic diagram showing an example thereof. In this example, the screen 30 is divided into an area 51 and an area 52. The area 51 displays the plurality of modes for selection and the area 52 displays image represented by the video signal PI.

The example of FIG. 2 shows three modes prepared as the plurality of modes: OFF mode, ON1 mode and ON2 mode. These three modes represent the following operations, for example:

(1) OFF mode: No power management operation.

(2) ON1 mode: Execute power management operation, in which the CRT heater is preheated during power management operation so that the image display can be immediately activated after the power management has been canceled.

(3) ON2 mode: Execute power management operation, in which power supply to the CRT heater is halted to reduce power consumption during power management operation (or the voltage is lowered to reduce supplied power).

While seeing the plurality of modes displayed in the form of OSD, the operator 7 operates an input device like a keyboard, mouse, etc. to select a desired one from among the plurality of modes. The selected result is displayed in the area 51. The operation signal detecting means 8 (FIG. 1) detects the contents of the selecting operation. On the basis of the detected result, the power management signal output selecting means 5 decides which of the on-screen-displayed modes has been selected by the operator 7 and on the basis of the decision it sets the mode to be realized during power management operation.

When OFF mode is selected, the operation is not moved into the power management operation irrespective of the presence/absence combination of the horizontal and vertical synchronizing signals SY sent from the computer 1.

When ON1 mode is selected, this mode is implemented when at least one of the horizontal and vertical synchronizing signals SY from the computer 1 is absent. In this mode, the CRT heater is preheated so that the image display can be reactivated soon after the power management has been canceled.

When ON2 mode is selected, this mode is implemented when at least one of the horizontal and vertical synchronizing signals SY from the computer 1 is absent. In this mode, power supplied to the CRT heater is halted (or the supplied power is lowered through voltage reduction) so that the power consumption can be saved more effectively.

It is desirable that the display device 19 has an On Screen Display control circuit 21 (simply referred to as OSD control circuit) as shown in FIG. 1 in order to display the plurality of modes in the OSD form. FIG. 3 is a block diagram showing an example of internal structure of the OSD control circuit 21 and the image display means 13 which enable a plurality of modes to be displayed in the form of OSD. In this example, the OSD control circuit 21 has a video signal generator 31 and a blanking signal generator 32. The image display means 13 has a mixing circuit 42, a preamplifier 43 and a main amplifier 44. For convenience, FIG. 3 does not show the signal detecting circuit 2 interposed between the computer 1 and the image display means 13 and the control circuit 25 interposed between the microcomputer 26 and the OSD control circuit 21.

The blanking signal generator 32 generates a blanking signal BLK for blanking the part corresponding to the area 51 on the screen 30 in the image represented by the video signal PI (see FIG. 2). The video signal generator 31 generates a video signal PO representing the plurality of modes displayed in the area 51. The mixing circuit 42 mixes the video signal PI and video signal PO during blanking period generated by the blanking signal BLK to generate a video signal representing an image as shown in FIG. 2 on the screen 30. The generated video signal is amplified through the preamplifier 43 and main amplifier 44 and is sent to the image output portion 20. The structure of FIG. 3 for realizing OSD display is conventionally known.

In the example shown in FIG. 2, the plurality of modes which the operator 7 can select correspond to combinations of respective modes for the plurality of power-managed unit components 13, 22, 23, 24 and 25 shown in FIG. 1, for example. Some of such combinations are prepared as the plurality of modes which the operator 7 can select. Alternatively, the plurality of modes may be prepared for a wider selection so that the operator 7 can select among modes individually corresponding to the plurality of unit components 13, 22, 23, 24 and 25.

Specifically, the display device 19 can be constructed so that all functional items of the power-supplied circuits, such as halting power supply to the CRT heater, shutting down power to the video circuit (image display means), can be displayed on the screen 30 in the OSD form; this allows the user (operator 7) to freely select which circuits (unit components) should be shut off from power supply during power management operation. Further, items such as the period until starting power management recovery conditions, etc. may be included so that the display device 19 can set modes meeting the operator's preferences.

Figure 4:
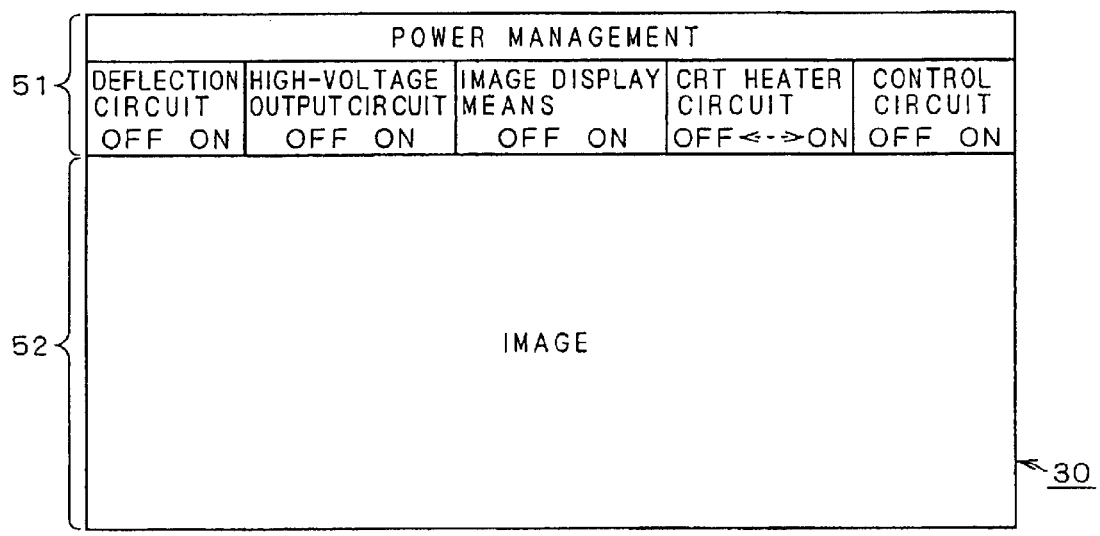
FIG. 4 is a schematic diagram showing another example of the plurality of power saving modes displayed in the form of OSD on the screen.
Figure 5:
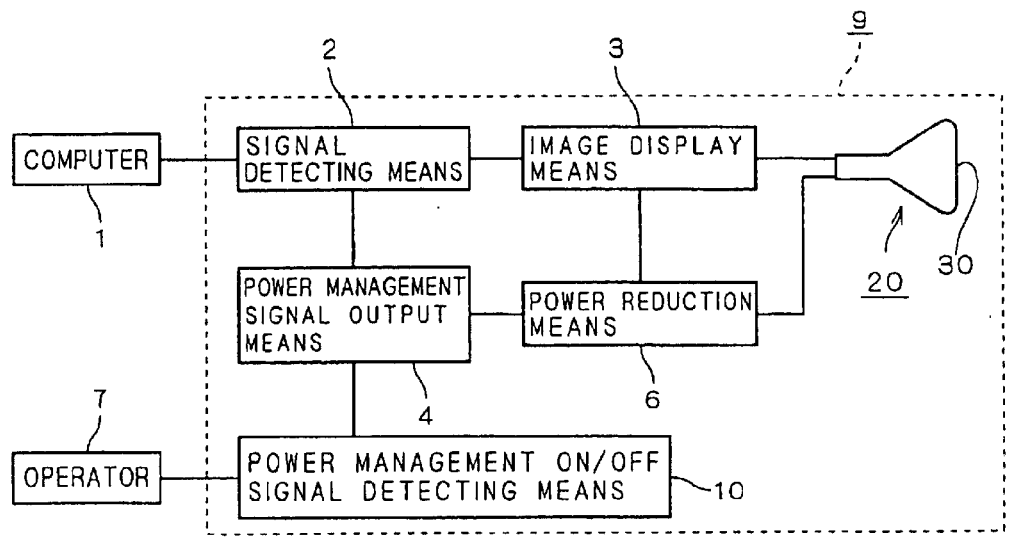
FIG. 5 is a block diagram showing the structure of a conventional display device.

FIG. 4 is a schematic diagram showing an example of display in which a plurality of modes prepared in this way are displayed in the form of OSD on the screen 30. In the example of FIG. 4, the area 51 displays a plurality of modes so that the power saving modes can be selected for each power-supply-controlled unit components. In this example, the above-mentioned plurality of modes correspond to all combinations of the modes of the individual unit components, where setting one combination corresponds to selecting one of the plurality of modes. The range of mode selection is considerably wider than that in the example shown in FIG. 2.

This structure allows the user (operator 7) to freely set modes to satisfy requirements for power reduction which will become stricter in the future. Further, the manufacturers can disclose recommendations about mode settings on the Internet etc. to provide more flexible energy savings.

Moreover, for example, the power supplied to the CRT heater circuit 24 may be made variable not in the two levels of ON/OFF but in a continuous manner as shown in FIG. 4, or in three or more levels. This enables a finer power saving.

Furthermore, while the example of FIG. 1 uses combinations of presence and absence of synchronizing signals SY from the computer 1 as a trigger signal for initiating power management, the present invention is not limited to this example. For example, when the computer 1 is configured to send out some signal indicative of an inactive period in which the user is not using the computer, this signal can be used as the trigger signal.

While the invention has been described in detail, the foregoing description is in all aspects illustrative and not restrictive. It is understood that numerous other modifications and variations can be devised without departing from the scope of the invention.

What is claimed is:

1. A display which displays an image on a screen in an image output portion on the basis of a received video signal, comprising:

power reduction means configured to reduce, in a plurality of modes, power supplied to a device component included in said display device;

power management output selecting means configured to make a setting to any of said plurality of modes on the basis of a selection made by an operator;

signal detecting means configured to detect a trigger signal; and power management signal output means configured to give an instruction to said power reduction means in response to detection of said trigger signal by said signal detecting means to perform said mode determined by said setting.

2. The display device according to claim 1, further comprising means configured to display said plurality of modes for selection on said screen in the form of on screen display, wherein said power management output selecting means makes said setting according to which of said plurality of on-screen-displayed modes said operator has selected.

3. The display device according to claim 2, wherein said device component includes a plurality of unit components, and wherein said means configured to display said plurality of modes in the form of on screen display displays items which can be selected individually for each said unit component as said plurality of modes on said screen in the form of on screen display.

4. The display device according to claim 1, wherein said image output portion is a cathode ray tube having a heater, and said device component includes a CRT heater circuit configured to supply power to said heater, and wherein said plurality of modes included a mode in which supply of power to said heater is kept on.

5. The display device according to claim 1, wherein said signal detecting means monitors a horizontal synchronizing signal and a vertical synchronizing signal accompanying said video signal and detects as said trigger signal a state in which at least one of said synchronizing signals is not being received.

* * * * *